US008068508B2

United States Patent
Radulescu et al.

(10) Patent No.: US 8,068,508 B2
(45) Date of Patent: Nov. 29, 2011

(54) ELECTRONIC CIRCUIT WITH PROCESSING UNITS COUPLED VIA A COMMUNICATION NETWORK

(75) Inventors: Andrei Radulescu, Eindhoven (NL); Johannus Theodorus Matheus Hubertus Dielissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1635 days.

(21) Appl. No.: 10/569,123

(22) PCT Filed: Aug. 10, 2004

(86) PCT No.: PCT/IB2004/051439
§ 371 (c)(1),
(2), (4) Date: Feb. 23, 2006

(87) PCT Pub. No.: WO2005/022849
PCT Pub. Date: Mar. 10, 2005

(65) Prior Publication Data
US 2007/0008959 A1 Jan. 11, 2007

(30) Foreign Application Priority Data
Aug. 29, 2003 (EP) .................................... 03103250

(51) Int. Cl.
*H04L 12/28* (2006.01)
(52) U.S. Cl. ........................................ 370/419; 710/316
(58) Field of Classification Search .................. 370/419, 370/235, 360; 709/232; 710/74
See application file for complete search history.

(56) References Cited

U.S. PATENT DOCUMENTS

| 5,367,523 | A | * | 11/1994 | Chang et al. ................... 370/235 |
| 5,453,982 | A | * | 9/1995 | Pennington et al. .......... 370/235 |
| 6,240,095 | B1 | | 5/2001 | Good et al. |
| 6,247,077 | B1 | * | 6/2001 | Muller et al. ................... 710/74 |
| 6,289,386 | B1 | | 9/2001 | Vangemert |
| 6,337,865 | B1 | * | 1/2002 | Seto et al. ...................... 370/450 |
| 6,426,943 | B1 | * | 7/2002 | Spinney et al. ............... 370/235 |
| 6,460,080 | B1 | | 10/2002 | Shah et al. |
| 6,594,701 | B1 | * | 7/2003 | Forin ............................ 709/232 |

(Continued)

FOREIGN PATENT DOCUMENTS
WO 0041365 A1 7/2000
(Continued)

OTHER PUBLICATIONS

Bhoedjang, R. A. F. et al: Efficient Multicast on Myrinet Using Link-Level Flow Control IEEE Comput. Soc. Aug. 1998, pp. 381-390, XP010298402.

(Continued)

*Primary Examiner* — Dang Ton
*Assistant Examiner* — Lionel Preval

(57) ABSTRACT

A two-way network interface is provided for both sending transmission messages and receiving reception messages between a pair of processors through a network. The network interface uses transmission messages to transmit both data and information representing respective amounts of unreported buffer space R for receiving data items from reception messages in a buffer storage circuit. The network interface holds up transmission until a number A of data items, that a particular one of the data processing circuits has made available for transmission in the message and for which buffer space is available across the network, exceeds a threshold. However the threshold is lowered, or the transmission message is transmitted before the threshold is exceeded in response to an increase in the amount R of unreported available buffer space in the buffer storage circuit for the particular one of the processing circuits.

9 Claims, 2 Drawing Sheets

U.S. PATENT DOCUMENTS 6,657,962 B1 * 12/2003 Barri et al. .................... 370/235
2004/0202155 A1 * 10/2004 Natarajan et al. ............. 370/360
2010/0046370 A1 * 2/2010 Ghose et al. .................. 370/235

FOREIGN PATENT DOCUMENTS

WO       WO 00/67131    * 11/2000

OTHER PUBLICATIONS

Liu J. et al: High Performance RDMA-Based MPI Implementation Over Infiniband ACM, vol. Conf. 17, Jun. 2003, pp. 295-304, XP001198482.

Verma M. et al: Pupa: A Low-Latency Communication System for Fast Ethernet, IPDPS Apr. 1998, pp. 1-13, XP002305195.

Roger Zimmermann, et al: A Multi-Threshold Onling Smoothing Technique for Variable Rate Multimedia Streams.

Dah Ming Chiu, et al: A Congestion Control Algorithm for Tree-Based Reliable Multicast Portocols, SMLI TR-2001-97, Jun. 2001.

Dr, Syed Ljlil Ali Shah, Bringing Comprehensive Quality of Service Capabilities to Next-Generation Networks, pp. 1-19.

Mellanox Technologies Inc: Introduction to Infiniband, No. WPO010800120.

Nazy Alborx, et al: Implementation of VirtualClock Scheduling Algorithm in OPNET.

* cited by examiner

ELECTRONIC CIRCUIT WITH PROCESSING UNITS COUPLED VIA A COMMUNICATION NETWORK

The invention relates to an electronic circuit, and in particular to an integrated circuit with a plurality of data processing units that communicate processing data to each other via a communication network.

In systems with multiple data processing units communication of data between different data processing circuits is an important factor for determining the effectiveness of the system. In simple systems direct connections between the processing circuits may be used, usually involving a number of data bus lines to which all processing units are connected, so that a transmitting circuit and a receiving circuit can instantaneously share status information.

In more complicated systems a communication network may be used to communicate data. Such a network generally causes a delay between the time of transmission of the data and the time of reception. Processing units lose direct control over the time of reception of messages. This introduces problems because it makes it difficult to know whether a processing unit can proceed by sending new data or that it should wait until the recipient is ready. To solve this a special mechanism is needed to coordinate reception and transmission circuits.

U.S. Pat. No. 6,594,701 discloses an electronic circuit wherein communication via a network is controlled by means of credit reports. A receiving circuit dynamically determines how much free buffer space it has available for receiving data from a transmitting circuit and sends credit reports about the available free buffer space through the network to the transmitting circuit. The transmitting circuit registers the reported credit, reduces the registered credit when data has been transmitted, and ensures that no more data is transmitted than can be stored in the buffer space that is registered to be freely available. Credit based communication can be seen as an extension of a handshake protocol, wherein the transmitting circuit, after sending a message, waits for a return signal from the receiving circuit that free space for a next message has become available. Compared to such a handshake protocol, credit based communication supports a higher data rate, because the transmitting circuit can decide to transmit a next message (as well as about the size of the message) on the basis of local information, generally without waiting for a next message about the release of buffer space.

U.S. Pat. No. 6,594,701 describes various algorithms that enable a receiving circuit to determine when it should send credit reports to the transmitting circuit. One proposed solution is to use time periodic reports. Another solution uses an estimate of the amount of credit that is available in the transmitting circuit: a credit report is sent if upon reception of a message from the transmitting circuit the previously reported credit, diminished by the amount of data that has since been received, falls below a threshold. The patent describes the use of different thresholds, dependent on the observed data rate of the transmitting circuit.

U.S. Pat. No. 6,460,080 describes credit based communication wherein the transmitting circuit sends credit requests to trigger transmission of credit reports. When the transmitting circuit wants to send a message, but insufficient credit is available, the transmitting circuit instead sends a credit request. The receiving circuit receives the credit request and returns a credit report, if necessary after waiting until sufficient free buffer space has become available.

Use of the network to exchange credit reports and, if applicable, credit requests consumes network bandwidth. It is desirable to minimize the amount of consumed bandwidth. U.S. Pat. No. 6,594,701 does so by reporting credit outside the network, but this complicates the communication circuitry.

An attractive possibility to reduce network bandwidth used for credit reports occurs when processing circuits have two-way data communication through the network. In this case, credit reports for transmission in one direction can be added to data in data messages that are sent in the other direction and vice versa. Thus message overhead can be shared by data and credit reports. However, the reduction of bandwidth use for credit reports should be realized in a way that does not or not significantly reduce the transmission rate of the data, e.g. by causing the transmitting circuit to suspend transmission to wait for credit reports.

Among others, it is an object of the invention to reduce network bandwidth used for credit reports without undesired effect on the rate with which data can be transmitted using the reported credit.

Among others, it is an object of the invention to make effective use of bidirectional data communication between a pair of processing circuits to reduce network bandwidth used for credit reports.

A circuit according to one embodiment of the invention uses bidirectional network interfaces. The network interfaces include, in at least part of outgoing messages with data items, information representing respective amounts of unreported buffer space R for receiving data items from incoming messages. A transmission control circuit for a network interface triggers sending of the outgoing messages. The transmission control holds up transmission until a number A of data items, that is available for transmission and for which buffer space is available across the network, exceeds a threshold, which is typically set to a plurality (>1) of data items. However, the transmission control circuit lowers the threshold, or suppresses the threshold altogether in response to an increase in the amount R of unreported available buffer space in the buffer storage circuit for the particular one of the processing circuits. Thus, on one hand, bandwidth use is reduced by combined sending of data and credit for return data and use of a threshold. On the other hand, delays due to unreported credit or data are reduced by lowering the threshold as the amount of unreported credit increases, and/or suppressing the threshold (i.e. no longer holding up transmission) when the amount of unreported credit exceeds a threshold. Preferably the threshold and the conditions under which the threshold is reduced are programmable.

In a further embodiment the transmission control circuit supports a flush command. In response to the flush command a count B is sampled of untransmitted data items that a processing circuit has previously made available. Transmission of one or more transmission messages is triggered until at least B data items have been sent, without waiting until the number A exceeds the threshold and/or the amount R of unreported available buffer space lowers or suppresses the threshold.

The threshold may effectively be lowered as time lapses after transmission of a message. The transmission control circuit may for example trigger transmission if the number A exceeds the threshold and/or the amount R exceeds a further threshold. This can be detected in a simple way. In another embodiment transmission is triggered if a weighted sum of the number A and the amount R exceeds a further threshold.

These and other objects and advantageous aspects of the invention will be described in more detail using the following figures.

Figure 1:
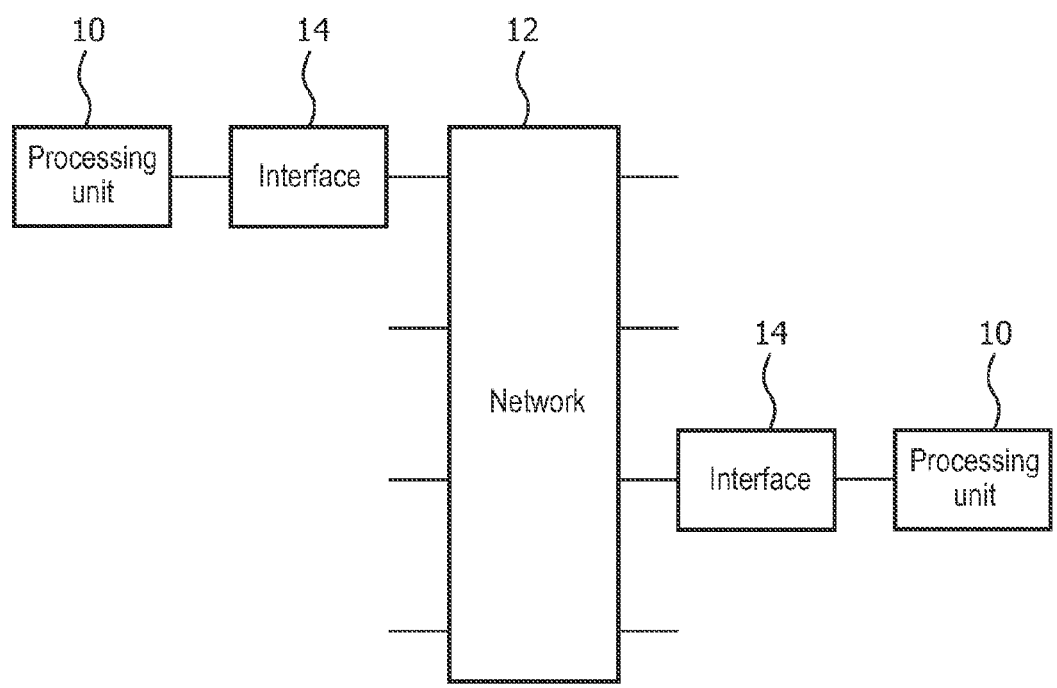
FIG. 1 shows an electronic circuit

FIG. 1 shows an electronic circuit that contains a number of processing circuits 10, a communication network 12 and network interface circuits 14. Processing circuits 10 are coupled to network 12 via network interface circuits 14. Communication network 12 has a plurality of terminals for different processing circuits 10 (eight shown by way of example), but for the sake of simplicity only two connected processing circuits 10 are shown. Communication network 12 may be of any known type. For example it may comprise cross-bar switches, repeaters etc. In particular it is possible that different messages can travel through network 12 simultaneously, so that messages cross each other in network 12. This allows a high processing speed.

Figure 2:
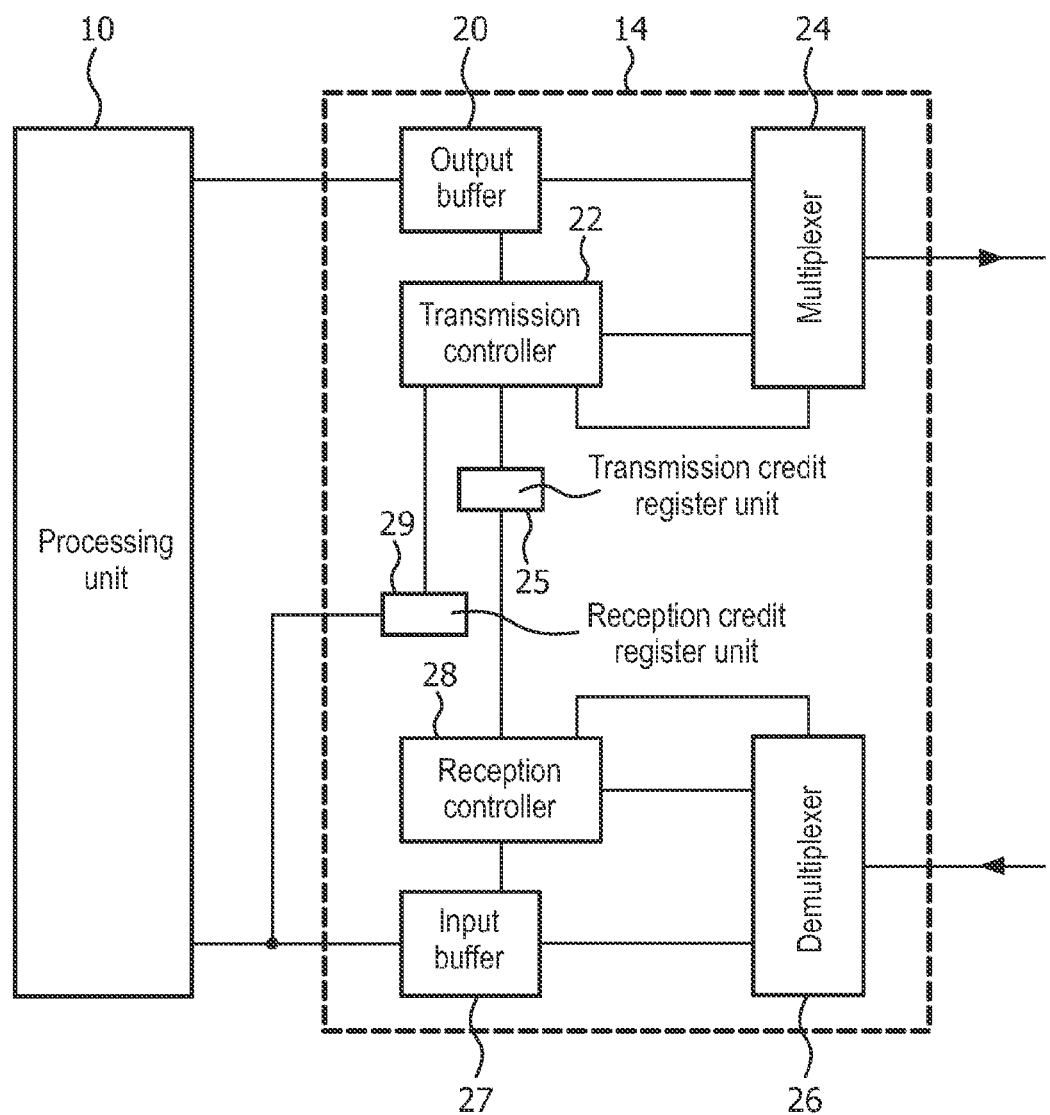
FIG. 2 shows a network interface

FIG. 2 shows an example of a bidirectional network interface circuit 14. In the example bi-directional network interface circuit 14 contains a FIFO (First In First Out) output buffer 20, a transmission control circuit 22, a transmission multiplexer 24, a transmission credit register unit 25, a reception demultiplexer 26, an FIFO input buffer 27, a reception control circuit 28 and a reception credit register unit 29. An output of processing circuit 10 is coupled to an input of FIFO output buffer 20. Transmission control circuit 22 is coupled to control inputs and outputs of FIFO output buffer 20, to a control input of transmission multiplexer 24, to transmission credit register unit 25 and to reception credit register unit 29. Transmission multiplexer 24 inputs coupled to transmission control circuit 22 and FIFO output buffer 20.

Reception demultiplexer 26 has outputs coupled to reception control circuit 28 and FIFO input buffer 27. FIFO input buffer 27 has an output coupled to an input of processing circuit 10. Reception control circuit 28 is coupled to FIFO input buffer 27, reception credit register unit 29 and a control input of reception demultiplexer 26. In operation data processing circuits 10 produce successive data items, such as words of 16, 32 or 64 bits for example. Network interface circuits 14 transmit the data items to other data processing circuits in messages via communication network 12. The other data processing units receive the messages and use the data items for further processing. A data processing circuit 10 writes the data items into FIFO output buffer 20. A conventional FIFO buffer interface (which signals to processing circuit 10 whether FIFO output buffer 20 is full or not) may be used to prevent that processing circuit 10 writes when FIFO output buffer 20 is full.

After some time transmission control circuit 22 initiates transmission of a message with a number of data items over network 12. In this case transmission control circuit 22 generates a header and causes transmission multiplexer 24 to output the header to network 12. The header may contain fields for a sync symbol, a destination address, a message length code and credit information. Next transmission control circuit 22 controls FIFO output buffer 20 to output data items to transmission multiplexer 24 and transmission multiplexer 24 to output that data to network 12. At the end of the message transmission control circuit may transmit a stop symbol and optional error correction data (the number of data items corresponds to the length specified in the header, but this length may be omitted when a stop symbol is used and vice versa; the advantage of a stop symbol is that data that arrives in output buffer 20 as the message is transmitted can be added to the message). The resulting message may have the following contents for example:

message=Header, data-item, data-item, data-item (Although an embodiment of the invention is described that uses production, transmission and consumption of entire data items, it should be understood that without deviating from the invention parts of for example the last data item may be transmitted spread over successive messages, or that the data-item grain size of different processing units may differ, so that what is a data-item for one processing circuit (e.g. a 64 bit word) is a group of more than one data-items (e.g. four 16 bit words) for another processing circuit).

Upon reception of a message reception demultiplexer 26 first passes the header to reception control circuit 28, which subsequently causes reception demultiplexer 26 to pass data items from the message to FIFO input buffer 27 and FIFO input buffer 27 to receive that data items. Processing circuit 10 successively reads the data items from FIFO input buffer 27. A conventional FIFO buffer interface (which indicates to processing circuit 10 whether or not FIFO buffer is empty) may be used between FIFO input buffer 27 and processing circuit 10 to prevent reading when FIFO input buffer 27 is empty.

Transmission credit register unit 25 of a particular transmitting network interface circuit 14 stores a number T (also called the amount of credit) that represents how much free buffer space is at least available in the FIFO input buffer 27 of another receiving network interface circuit 14 to which messages are transmitted. Reception credit register unit 29 of the particular transmitting network interface circuit 14 stores a number R that represents how much unreported free buffer space is available in the FIFO input buffer 27 of the particular transmitting network interface circuit 14.

Transmission control circuit 22 limits the amount of data L in transmitted messages so that no more data is output from FIFO output buffer 20 into the message than the available free buffer space T indicated by transmission credit register unit 25. When the message is sent transmission control circuit 22 causes the amount of credit T in transmission credit register unit 25 to be lowered in correspondence with the amount L of transmitted data.

Transmission control circuit 22 includes credit information R in the header, to report the availability of previously unreported free space in FIFO input buffer 27. Reception credit register unit 29 of a particular transmitting network interface circuit 14 stores a number R representing how much unreported free buffer space is available in the FIFO output buffer 27 of the network interface circuit 14. Each time when processing circuit 10 reads a data item from FIFO input buffer 27 reception credit register unit 29 increases the number R of unreported free buffer space. When transmission control circuit 22 transmits a message, it reads the amount R of unreported free buffer space from reception credit register unit 29, inserts a number representing this amount R in the header of the message and resets reception credit register unit 29 to a zero amount R=0 in reception credit register unit 29. Without deviating from the invention a lower amount P<R may be reported, in which case the amount represented in reception credit register unit 29 is lowered by P.

Upon reception of a message reception control circuit 28 reads the amount R' of unreported free space from the header and causes transmission credit register unit 25 to increase the amount T of available free buffer space by the amount R' of unreported free space from the header.

Messages are transmitted at selected times. Transmission control circuit 22 determines when a message will be transmitted on the basis of the amount of data A that can be sent from FIFO output buffer 20 and the amount R of unreported available free space indicated by reception credit register unit 29. Transmission control circuit 22 sends a message when any one or both of the amount of data A and/or the amount R of unreported available free space has risen sufficiently. In one embodiment, the criterion for sending a message is $A>M_1$ or $R>M_2$ Here $M_1$ and $M_2$ are threshold values, which are preferably programmable, so that operation of the interface can be adapted to the operating context. The amount of data A that can be sent from FIFO output buffer 20 is determined for example as the smallest of the amount B of data in FIFO output buffer 20 and the amount of credit T from transmission credit register unit 25. However, it should be appreciated that other criteria for transmitting a message are possible, for example, such as $\alpha A+R>M$ where $\alpha$ is some positive weight factor or $(B>M_3$ and $T>M_4)$ or $R>M_5$ The thresholds M, $M_3$, $M_4$, $M_5$ preferably are programmable so that operation of the interface can be adapted to the operating context.

In the transmitted message such data is transmitted as is (a) available and (b) can be received according to the amount of credit T. It should be noted that the decision to transmit a message does not necessarily require at least a predetermined amount of data to be available, or the availability of at least a predetermined amount of credit. When the amount R of unreported available free space rises sufficiently a message will be sent anyway, even if the amount of data in the message is zero or very small.

It should be appreciated that in this type of criterion on the one hand one or more thresholds are used to ensure a minimum use of network bandwidth and on the other hand the threshold for any one of data and credit can be overruled so that at least no excessive amount of unreported free space R accumulates. Network bandwidth use is reduced because credit information R is reported as much as possible when normal data is transmitted. Network bandwidth use is also reduced because data is accumulated so that multiple data items from FIFO output buffer 20 are preferably combined into one message, so that the overhead for the header can be shared. To reduce bandwidth use, the threshold $M_1$ (or the thresholds $M_3$ and $M_4$) is preferably set as high as possible without causing the receiving data processing circuit 10 to wait for data. When insufficient data is available a message is sent nevertheless if sufficient unreported free buffer space R is available. To reduce bandwidth use the threshold $M_2$ (or $M_5$) is preferably set as high as possible without causing the receiving data processing circuit 10 to wait for buffer space.

The network may impose a fixed length on the messages, or a maximum length. In this case this length may be used as a threshold value $M_1$ (or the thresholds $M_3$ and $M_4$). In case of fixed length messages, when a message is sent because the unreported free buffer space R exceeds a threshold, it may be necessary to leave space for data in the message unused if insufficient transmittable data A is available.

In a further embodiment time is used as an additional trigger to send messages. For example transmission control circuit 22 may contain a timer and may be arranged to transmit a message if there is any data (A>0) or unreported free buffer space (R>0) and no message has been send for a predetermined time. In another embodiment transmission control circuit 22 thresholds ($M_1$, $M_2$, $M_3$, $M_4$, $M_5$ and/or M) may be reduced with time after transmitting a last previous message. In another embodiment the unreported free space and/or untransmitted data may be weighted heavier in a criterion for transmitting a message according to the time interval that has lapsed since the unreported free space and/or untransmitted data has become available. For example, the criterion could be $\min(T, \Sigma_i w(t-t_i))>M_1$ or $\Sigma_j R_j w'(t-t_j)>M_2$ Here i identifies different data items, j different regions of buffer space, $t-t_i$ the lapsed time since data item i has been written, $t-t_j$ the lapsed time since region j with size Rj has become available, and w( ) and w'( ) are weight functions that increase with increasing lapsed time. Similarly, an accumulated weight could be defined by computing a new accumulated weight $W_n=w+\beta(t_i-t_{i-1})W_{n-1}$ each time when a new data item arrives, $\beta(t_i-t_{i-1})>1$ rising with time and a similar weight $W'_n=R_j+\beta(t_j-t_{j-1})W_{n-1}$ for the buffer space. In this case the criterion might be $\min(T, W)>M$, or $W'>M_2$ As an alternative the credit amount may also be weighted increasingly as a function of time. As another alternative the weights may increase (or, correspondingly, the thresholds may decrease as a function of time since the last transmitted message).

In another embodiment transmission control circuit 22 is arranged to respond to a "flush" command from processing circuit 10. When transmission control circuit 22 detects a flush command, it samples information about the amount of data that is in FIFO output buffer 20. Subsequently transmission control circuit 22 overrules the criterion for transmitting messages and transmits a message (or messages) each time when credit T>0 is available until at least the sampled amount of data has been transmitted in the messages. Subsequently transmission control circuit 22 reverts to the original criterion for transmitting messages.

Although the invention has been illustrated for communication between a pair of processing circuits 10, it should be appreciated that any processing circuit 10 may communicate with more than one other processing circuit 10 via network 12. In this case the processing circuit 10 may be connected to network 12 via a plurality of network interfaces. Different network interfaces may share the same connection to network 12, e.g. in multiplex fashion. Of course, different network interfaces may share hardware, such as multiplexer 24, transmission control circuit 22 etc, but separate credit numbers T should be maintained for different network interfaces.

In one embodiment a plurality of FIFO output buffers and/or FIFO input buffers is used in parallel, for different data streams. In this case an arbiting scheme is used to select in which order the FIFO output buffers will be used to supply data. Any suitable scheme may be used, such as a round robin scheme or a priority base scheme.

Preferably also separate numbers representing unreported free space should be maintained, but optionally different network interfaces 14 may take out unreported free space from the same pool, so that a single number R is used. In this case each network interface 14 may report for example a predetermined fraction of the number R, e.g. one interface 40% and the other 60%. Of course many pairs of processing circuits 10 may be communicating via network 12 in parallel. A network interface may switch from communicating with the network interface for one processing circuit to communicating with the network interface for another processing circuit. In this case the amounts R and T are of course preferably first reset.

Although the invention has been described using specific embodiments, it should be appreciated that many alternative embodiments are possible. For example, transmission control circuit 22 and reception control circuit 28 may be implemented in as one circuit and register units 25, 29 may be implemented as memory locations accessible to transmission control circuit 22 and reception control circuit 28. Alternatively register units 25, 29 may include a register and circuits for updating the content of the registers autonomously, such as adders etc.

In another embodiment, network 12 may impose a maximum length on messages, in which case a message may not contain all A available data-items from FIFO output buffer 20 for which there is credit T. In this case, preferably the maximum allowable number of data items is included in the message. This reduces the number of transmittable data-items A, after which the criterion is applied anew to decide whether a next message should be sent. Alternatively, a series of messages may be sent to send all A data items, without testing the criterion once it has been decided to send a first message. However, this increases bandwidth use.

Similarly the length of the field in the message for reporting available free buffer space R may make it impossible to report all available free buffer space. In this case, preferably the maximum allowable amount of free buffer space is reported in the message and R is decreased accordingly in reception credit register unit 29. This reduces the amount of unreported credit R, after which the criterion is applied anew to decide whether a next message should be sent. Alternatively, a series of messages may be sent to report all credit, without testing the criterion once it has been decided to send a first message. However, this increases bandwidth use.

As another example, instead of FIFO input and output buffers 20, 27, other types of memory may be used to store data. For example any one or both of buffers 20, 27 may be replaced by memories that are addressed by data processing circuit, or are part of a larger memory, which for example contains locations for both data to be transmitted and received data, as well as other data.

In this case a queue of transmission requests may be maintained, to which a request is added when data processing circuit 10 signals that data for a complete data item for transmission has been written and a request is removed when transmission control circuit 22 has caused the data from the data item to be transmitted in a message. Similarly a queue of reception reports may be maintained, to which reports are added when data-items from a message have been written into memory and from which reports are deleted when data processing circuit 10 signals that data-items are no longer needed. If so, the unreported free buffer space R is increased.

However, it will be appreciated that the use of a FIFO output buffer 20 and/or input buffer 27 considerably simplifies design, requiring less circuit area for the network interfaces.

Furthermore the invention is not limited to buffers of fixed size, or even at fixed locations in memory. Processing circuit 10 may decide to increase or decrease buffer space either for reception or for transmission or both. Of course the amount of unreported free space R will be changed accordingly, so that it may even become negative (the actual decrease of space is delayed with respect to the update of the amount R, until R returns to a non-negative value due to subsequent release of space by data processing circuit 10).

Similarly processing circuit 10 may signal the availability of buffer space to network interface 14 each time by supplying an address (and optionally a length) of newly available buffer space. The supplied address may be an address used for data from a previous message which is no longer needed, but it may be any other address as well. Thus the buffer need not be bound to any specific memory area. Network interface 14 uses the supplied address to write data from arriving messages into memory. In this case, the amount of unreported free space R is increased each time according to the signalled buffer space.

In fact, it is not even necessary to provide a FIFO output buffer 20 or equivalent storage space to store data items prior to transmission. In another embodiment, data processing circuit 10 is arranged to generate data items on command from transmission control circuit 22, when the message is assembled. In this case, data processing circuit 10 merely reports readiness to generate a certain number of data items in response to such a command.

In each of these embodiment transmission control circuits triggers transmission of messages using information about both the amount of transmittable data and the amount of unreported free space R to determine whether a message with data, if any, and unreported free buffer space, if any, should be transmitted.

The invention claimed is:
1. An electronic circuit, comprising:
a plurality of data processing circuits;
a communication network for passing messages between the data processing circuits;
buffer storage circuits for storing data items received from the network for use by respective ones of the data processing circuits;
bidirectional network interfaces, each for packing data items from an associated one of the processing circuits into transmission messages and transmitting the transmission messages via the network, and for receiving reception messages from the network and unpacking data items from each reception message for use by the associated one of the processing circuits, the network interfaces including, in at least part of the transmission messages, information representing respective amounts of unreported buffer space R for receiving data items from the reception messages in the buffer storage circuit for the associated one of the processing circuits;
a transmission control circuit, arranged to trigger sending of the transmission messages with data items from a particular one of the processing circuits, the transmission control circuit being arranged to hold up transmission until a number A of data items, that the particular one of the processing circuits has made available and for which buffer space is available across the network, exceeds a threshold, the transmission control circuit lowering the threshold, or suppressing the threshold altogether in response to an increase in the amount R of unreported available buffer space in the buffer storage circuit for the particular one of the processing circuits.
2. An electronic circuit, comprising:
a plurality of data processing circuits;
a communication network for passing messages between the data processing circuits;
buffer storage circuits for storing data items received from the network for use by respective ones of the data processing circuits;
bidirectional network interfaces, each for packing data items from an associated one of the processing circuits into transmission messages and transmitting the transmission messages via the network, and for receiving reception messages from the network and unpacking data items from each reception message for use by the associated one of the processing circuits, the network interfaces including, in at least part of the transmission messages, information representing respective amounts of unreported buffer space R for receiving data items from the reception messages in the buffer storage circuit for the associated one of the processing circuits; and a transmission control circuit, arranged to trigger sending of the transmission messages with data items from a particular one of the processing circuits, the transmission control circuit being arranged to hold up transmission until a number A of data items, that the particular one of the processing circuits has made available and for which buffer space is available across the network, exceeds a threshold, the transmission control circuit lowering the threshold, or suppressing the threshold altogether in response to an increase in the amount R of unreported available buffer space in the buffer storage circuit for the particular one of the processing circuits, wherein the transmission control circuit is arranged to receive a flush command from the particular one of the processing circuits, and in response to the flush command to determine a number B of untransmitted data items that the particular one of the processing circuits has previously made available for transmission, and to trigger transmission of one or more transmission messages until at least B data items have been sent without waiting until the number A exceeds the threshold and/or the amount R of unreported available buffer space lowers or suppresses the threshold.

3. The electronic circuit according to claim 1, wherein the transmission control circuit is arranged to lower the threshold on the number of data items A and/or increases the reduction of the threshold as a function of the amount R, and/or suppresses the threshold at a lower amount R, as a function of the length of the time interval that has lapsed since these data items and/or unreported buffer space has become available or since transmission of a last previous transmission message.

4. The electronic circuit according to claim 1, wherein the transmission control circuit is arranged to trigger transmission if the number A exceeds the threshold and/or the amount R exceeds a further threshold.

5. The electronic circuit according to claim 1, wherein the transmission control circuit is arranged to trigger transmission if a weighted sum of the number A and the amount R exceeds a further threshold.

6. A method of transmitting data between data processing circuits across a network in an electronic circuit, the method comprising:
   packing data items from a processing circuit into transmission messages and transmitting the transmission messages via the network;
   receiving reception messages from the network and unpacking data items from each reception message for use by the processing circuit;
   including in at least part of the transmission messages information representing respective amounts of unreported buffer space R for receiving data items from the reception messages in a buffer storage circuit for the processing circuit;
   holding up transmission of a transmission message from a particular one of the data processing circuits until a number A of data items, that the particular one of the data processing circuits has made available for transmission in the message and for which buffer space is available across the network, exceeds a threshold,
   lowering the threshold, or transmitting the transmission message before the threshold is exceeded in response to an increase in the amount R of unreported available buffer space in the buffer storage circuit for the particular one of the processing circuits.

7. The electronic circuit of claim 1, wherein a weight of at least one of the amount R of unreported available buffer space and a number B of untransmitted data is increased with increasing lapsed time since the unreported available buffer space and/or the untransmitted data has become available.

8. The method of claim 6, further comprising increasing a weight of at least one of the amount R of unreported available buffer space and a number B of untransmitted data with increasing lapsed time since the unreported available buffer space and/or the untransmitted data has become available.

9. A method of transmitting data between data processing circuits across a network in an electronic circuit, the method comprising the acts of:
   packing data items from a processing circuit into transmission messages and transmitting the transmission messages via the network;
   receiving reception messages from the network and unpacking data items from each reception message for use by the processing circuit;
   including in at least part of the transmission messages information representing respective amounts of unreported buffer space R for receiving data items from the reception messages in a buffer storage circuit for the processing circuit;
   holding up transmission of a transmission message from a particular one of the data processing circuits until a number A of data items, that the particular one of the data processing circuits has made available for transmission in the message and for which buffer space is available across the network, exceeds a threshold;
   lowering the threshold, or transmitting the transmission message before the threshold is exceeded in response to an increase in the amount R of unreported available buffer space in the buffer storage circuit for the particular one of the processing circuits; and
   in response to a flush command, determining a number B of untransmitted data items that the particular one of the processing circuits has previously made available for transmission, and triggering transmission of one or more transmission messages until at least B data items have been sent without waiting until the number A exceeds the threshold and/or the amount R of unreported available buffer space lowers or suppresses the threshold.

* * * * *